United States Patent [19]

Tanaka et al.

[11] Patent Number: 4,739,338

[45] Date of Patent: Apr. 19, 1988

[54] HEAT-SENSITIVE TRANSFER RECORDING METHOD

[75] Inventors: Kazumi Tanaka; Masato Katayama, both of Yokohama; Hiroshi Sato, Hiratsuka; Yasuyuki Tamura, Yokohama, all of Japan

[73] Assignee: Canon Kabushiki Kaisha, Tokyo, Japan

[21] Appl. No.: 881,793

[22] Filed: Jul. 3, 1986

[30] Foreign Application Priority Data

Jul. 12, 1985 [JP] Japan .............................. 60-152432

[51] Int. Cl.[4] ........................ G01D 15/10; B41J 3/20; G03C 5/16

[52] U.S. Cl. ............................... 346/1.1; 346/76 PH; 400/120; 400/241.1; 400/241.2; 430/348

[58] Field of Search .............. 346/1.1, 76 PH; 428/93; 400/120, 241.1, 241.2; 430/41, 44, 49, 145, 138, 348

[56] References Cited

U.S. PATENT DOCUMENTS 4,281,050 7/1981 Buckley et al. ...................... 430/41

4,477,198 10/1984 Bowlds et al. ...................... 400/120

*Primary Examiner*—Clifford C. Shaw

*Assistant Examiner*—Gerald E. Preston

*Attorney, Agent, or Firm*—Fitzpatrick, Cella, Harper & Scinto

[57] ABSTRACT

A heat-sensitive transfer recording method comprises superposing a heat-sensitive transfer material having a heat-transferable ink layer on a supporting member onto a medium for recording and heating said heat-transferable ink layer according to a pattern to thereby form a transfer recorded image on said medium for recording, wherein said heat-transferable ink layer comprises a layer containing fine particles of a heat-fusible resin and said heat-sensitive transfer material after heating is separated from said medium for recording within the time from when the strength of the film formed by fusion of the fine particles of the heat-fusible resin at said pattern heated portion begins to surpass that before heating until initiation of fusion of fine particles of the heat-fusible resin around the pattern heated portion by thermal diffusion to around the pattern heated portion.

16 Claims, 2 Drawing Sheets

HEAT-SENSITIVE TRANSFER RECORDING METHOD

BACKGROUND OF THE INVENTION

1. Field of the Invention

This invention relates to a heat-sensitive transfer recording method which can give a transfer recorded image of good printing quality even on a medium for recording having poor surface smoothness.

2. Related Background Art

The heat-transfer recording method has specific features of requiring no processed paper of chromogenic type and also having excellent durability of recorded image in addition to the general specific features of the heat-sensitive transfer recording method of light and compact device used, no noise and excellent operability and maintenance, and has been widely used in recent years.

The heat-sensitive transfer recording method uses a heat-sensitive transfer material comprising a heat transferable ink layer having a colorant dispersed in a heat-fusible binder provided by coating on a supporting member which is generally shaped in a sheet, superposes the heat-sensitive transfer material on a medium for recording so that the heat transferable ink layer may contact the medium for recording and transfers the melted ink layer onto the medium for recording by supplying heat from a thermal head from the side of the supporting member, thereby forming a transfer recorded image corresponding to the shape of heat supply (pattern) on the medium for recording.

However, according to the heat-sensitive transfer recording method of the prior art, the transfer recording performance, namely the printing quality, is greatly influenced by the surface smoothness of the medium for recording and therefore, although good printing can be effected on a medium for recording with high smoothness, there is involved the problem that printing quality will be markedly lowered in the case of a medium for recording with low smoothness. For this reason, a paper with high surface smoothness is generally used as the recording medium. However, papers with high smoothness are rather special, and ordinary papers will have various sizes of unevenness formed by entanglement of fibers. Accordingly, in the case of a paper with large surface unevenness, the thermally fused ink cannot penetrate into the fibers of paper during printing, but the ink is attached only at the convexity or in the vicinity thereof, whereby printing quality may be lowered because the edge portion of the printed image is not sharp or a part of image is defective.

In the prior art, in order to obtain a recorded image of good printing quality on such a medium for recording with poor surface smoothness, there has been employed a method based on the idea of permitting the fused ink to be attached to or to penetrate faithfully even the fine uneven structure of the medium for recording such as paper, by, for example, using a heat-fusible binder with small melt viscosity at least in the surface layer or increasing the layer thickness of the heat-transferable ink layer. However, when a binder with small melt viscosity is used, the ink layer is tacky also at relatively lower temperature to cause inconveniences such as lowering of adhesiveness and storability and contamination at the non-printed portion of the medium for recording, and also blurring of transferred image may occur. On the other hand, when the transferable ink layer is made to have a large layer thickness, blurring becomes greater and also the amount of heat supplied from the thermal head is required to be increased with the result that printing speed will be lowered.

SUMMARY OF THE INVENTION

The present invention has been accomplished in order to solve the problems of the prior art and provides a heat-sensitive transfer recording method which can give a printed letter which is high in density and also good in sharpness not only on a medium for recording having good surface smoothness, as a matter of course, but also on a medium for recording having poor surface smoothness, while maintaining various heat-transfer performances.

More specifically, the heat-sensitive transfer recording method provided by the present invention is a heat-sensitive transfer recording method by superposing a heat-sensitive transfer material having a heat-transferable ink layer on a supporting member onto a medium for recording and heating said heat-trnasferable ink layer according to a pattern to thereby form a transfer recorded image on said meidum for recording, wherein said heat-transferable ink layer comprises a layer containing fine particles of a heat-fusible resin and said heat-sensitive transfer material after heating is separated from said medium for recordng within the time from when the strength of the film formed by fusion of the fine particles of the heat-fusible resin at said pattern heated portion begins to surpass that before heating until initiation of fusion of fine particles of the heat-fusible resin around the pattern heated portion by thermal diffusion to around the pattern heated portion.

DETAILED DESCRIPTION OF THE PREFERRED EMBODIMENTS

Figure 1:
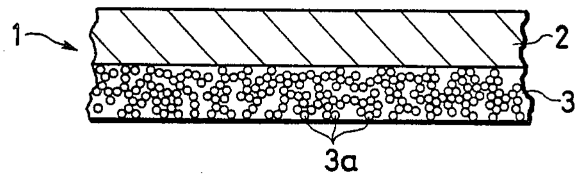
FIG. 1 is a schematic sectional view for illustration of a constitutional example of the heat-sensitive transfer material to be used in the method of the present invention.

In the heat-sensitive transfer recording method of the present invention, a heat-sensitive transfer material is used, which has a heat transferable ink layer containing heat-fusible fine particles. The fine particles are capable of forming a recorded image with high cohesive force by forming a film through fusion mutually between fine particles or between fine particles and a heat-fusible binder (non-particulate) at the pattern heated portion. Besides, by performing separation of the heat-sensitive transfer material from the medium for recording after heating within the specific range of time as mentioned above, a transfer recorded image of good printing quality can be formed also on a medium for recording having poor surface smoothness.

As described above, the heat applied portion (pattern heated portion) of the heat transferable ink layer in the present invention forms a recorded image with high cohesive force through fusion mutually between the fine particles of the heat-fusible resin or between said fine particles and a heat-fusible binder (non-particulate) optionally contained, and at the same time adhesive force only to the medium for recording at the pattern heated portion is created. Further, by performing separation between the heat-sensitive transfer material and the medium for recording within the specific range of time as defined above, the ink layer at the pattern heated portion can be cooled within the time after heat application until separation, whereby cohesive force of the recorded image can be improved and adhesive force between the recorded image and the medium for recording can be improved. By improvement of cohesive force of the recorded image, the recorded image will not be cut even on an uneven surface of the medium for recording, thus giving no defective printing. Also, since the ink layer comprises a layer containing fine particles and cohesive force as well as adhesive force at the pattern heated portion can be improved, printing sharpness becomes very good. For the reasons as mentioned above, according to the recording method of the present invention, good printing can be obtained even on a paper having excessive unevenness.

The present invention is described in more detail by, if necessary, referring to the drawings. In the description shown below, "%" and "parts" representing quantitative proportion are by weight unless otherwise particularly noted.

FIG. 1 is a schematic sectional view in the thickness direction showing one example of the heat-sensitive transfer material to be used in the heat-sensitive transfer recording method of the present invention.

That is, the heat-sensitive transfer material 1 comprises a heat transferable ink layer 3 on a supporting member 2 generally shaped in a sheet. In the drawing shown, the ink layer 3 consists of one layer, but a multilayer structure may be also used. In the case of a multilayer structure, at least one layer must be an ink layer having particulate characteristic.

For the supporting member 2, films or papers known in the prior art can be used as such. For example, there may be preferably used films of plastics having relatively good heat resistance such as polyester, polycarbonate, triacetyl cellulose, polyamide, polyimide, etc., cellophane or parchment paper, condenser paper, etc.

The supporting member 2 may have a thickness which is desirably about 1 to 15μ when considering a thermal head as the heating source during heat transfer but is not particularly limited when using a heating source which can heat selectively the heat transferable ink layer such as laser beam, etc. Also, when a thermal head is used, the heat resistance of the supporting member can be improved by providing a heat resistant protective layer comprising silicone resin, fluorine resin, polyimide resin, epoxy resin, phenol resin, melamine resin, nitrocellulose, etc., on the surface of the supporting member to be contacted with the thermal head, or it is also possible to use supporting member materials which could not be used in the prior art.

The heat transferable ink layer 3 contains a heat-fusible binder, a colorant, etc., if necessary, together with fine particles of the heat-fusible resin 3*a*.

The fine particles of the heat-fusible resin 3*a* may include those obtained by the method according to polymerization process such as emulsion polymerization, suspension polymerization, etc., the method in which a heat-fusible resin is mechanically dispersed by use of a dispersing agent, etc. or otherwise the mechanical crashing method, the spray drying method, the precipitation method, etc. Among them, it is preferred that the softening temperature of fine particles should be 50° C. to 160° C., preferably 60° C. to 150° C. and those having a particle size of 0.01 to 20 μm, preferably 0.1 to 10 μm should comprise 80 wt. % or more of the fine particles of the heat-fusible resin as the whole. The softening temperature mentioned here refers to the flow initiating temperature of a sample when measured by a flow tester CFT-Mode 500 (produced by Shimazu Seisakusho) under the conditions of a load of 10 kg and a temperature elevation speed of 2° C./min.

The resin constituting the fine particles can be selected suitably from among the resins satisfying the conditions such as the above softening temperature, etc., including, for example, polyolefin resins, polyamide, resins, polyester resins, epoxy resins, polyurethane resins, polyacrylic resins, polyvinyl chloride resins, polyvinyl acetate resins, petroleum resins, phenol resins, polystyrene resins, elastomers such as styrene-butadiene rubber, isoprene rubber, etc.

Examples of heat-fusible binders which may be used if necessary may include natural waxes such as whale wax, bees' wax, lanolin, carunauba wax, canderilla wax, montan wax, etc.; synthetic waxes such as paraffin wax, microcrystalline wax, oxidized wax, ester wax, low molecular weight polyethylene, etc.; higher fatty acids such as lauric acid, myristic acid, palmitic acid, stearic acid, behenic acid, etc.; higher alcohols such as stearyl alcohol, behenyl alcohol, etc.; esters such as fatty acid esters of sucrose, fatty acid esters of sorbitan, etc.; amides such as stearic amide, oleic amide, etc.; polyolefin resins, polyamide resins, polyester resins, epoxy resins, polyurethane resins, polyacrylic resins, polyvinyl chloride resins, cellulose resins, polyvinyl alcohol resins, petroleum resins, phenol resins, polystyrene resins, etc.; elastomers such as natural rubber, styrene-butadiene rubber, isoprene rubber, chloroprene rubber, etc.; or oils such as mineral oils, vegetable oils, etc. These binders may be used as suitable mixtures.

The heat-fusible binder has a softening temperature which may be within the range of from 40° C. to 150° C., preferably from 60° C. to 140° C. Its melt viscosity should preferably indicate 2 to 200000 centipoise at 150° C. (rotary viscometer).

In the present invention, the amount of the heat-fusible binder used may preferably be within the range of from 0 to 400 parts by weight, more preferably from 0 to 200 parts by weight, per 100 parts by weight of the above fine particles of the heat-fusible resin.

As the colorant, there may be used all of known dyes or pigments, including Carbon Black, Nigrosine Pigment, Lamp Black, Sudan Black SM, Fast Yellow G, Benzidine Yellow, Pigment Yellow, Indofast Orange, Irgadine Red, Paranitroaniline Red, Toluidine Red, Carmine FB, Permanent Boldur FRR, Pigment Orange R, Risol Red 2G, Lake Red C, Rodamine FB, Rodamine B Lake, Methyl Violet B Lake, Phthalocyanine Blue, Pigment Blue, Brilliant Green B, Phthalocyanine Green, Oil Yellow GG, Zapon Fast Yellow CGG, Kayaset Y963, Kayaset YG, Sumiplast Yellow GG, Zapon Fast Orange RR, Oil Scarlet, Sumiplast Orange G, Orasol Brown G, Zapon Fast Scarlet CG, Aizenspilon Red BEH, Oil Pink OP, Victoria Blue F4R, Fastgen Blue 5007, Sudan blue, Oil Peacock Blue.

The heat transferable ink layer may have a thickness generally within the range of from 1 to 20 μm, preferably from 2 to 15 μm.

The ink layer may be sometimes constituted only of fine particles of the heat-fusible resin and in this case a colorant may also be contained in the particles, if desired, and in this case securing of the particles onto the supporting member can be accomplished by thermal fusion, etc.

According to the heat-sensitive transfer recording method of the present invention, the fine particles in the ink layer subjected to pattern heating are fused mutually together with each other or the fine particles are fused with the heat-fusible binder, whereby a film with high cohesive force is formed at the pattern heated portion in the ink layer. With the ink layer comprising fine particles being as the film, cohesive force can be increased and further adhesive force to paper is created by application of heat, whereby good printing can be obtained without defect in printing and good printing sharpness even on a medium for recording having excessive unevenness.

The mechanism of the present invention is described in detail below.

Figure 2:
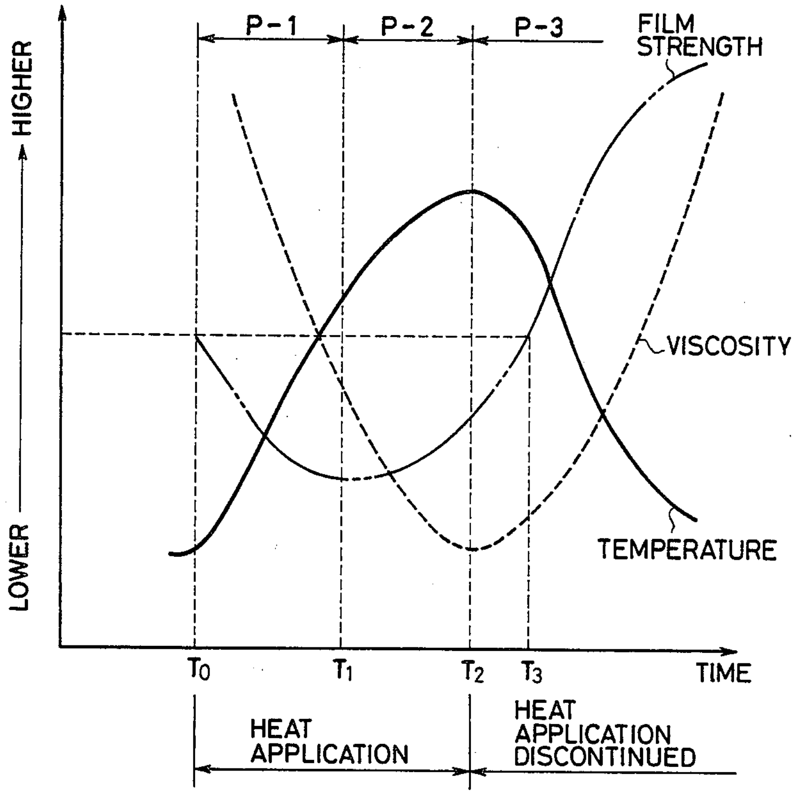
FIG. 2 is a graph of the curves showing schematically the characteristic changes of the heat transferable ink layer during recording in the heat-sensitive transfer recording method of the present invention.

As shown in FIG. 2, heat begins to be applied from a thermal head on the ink layer ($T_0$), and the temperature at the pattern heated portion takes the change as shown by the solid line in the drawing. That is, the temperature rises during heat application and drops down immediately after completion of application. Also, the film strength of the ink layer (shown by chain double-dashed line) falls down (in the section of p-1) first with temperature rise due to reduction in viscosity of the ink layer as a whole (shown by the broken line), but the film strength is increased (in the section of p-2) when fusion between fine particles of heat-fusible resin in the ink layer begins ($T_1$) and the ink layer progressively becomes more uniform. Further, after completion of heat application, the viscosity rises as the temperature of the ink layer as the whole is lowered, and the film strength is further increased (in the section of p-3) the ink layer becomes more uniform when the melting temperature of fine particles of heat-fusible resin is maintained.

Thus, the heat applied portion becomes more uniform and the film strength becomes greater than the non-applied portion, whereby the recorded image can be obtained in shape of a pattern.

Also, as is apparent from the foregoing explanation, if the time after heat application until separation between the heat-sensitive transfer material and the medium for recording is shortened (before $T_2$), no good recorded image can be obtained because the film strength of the recorded image is lowered. On the other hand, if the time before separation is too long, thermal diffusion around the recorded image progresses so far that no recorded image with good sharpness can be obtained because of fusion of the particles around the pattern heated portion.

The heat transferable ink layer can be formed on the supporting member according to the method, in which a coating liquid containing fine particles of heat-fusible resin or a dispersion containing the same and a heat-fusible binder or a solution or a dispersion thereof, colorant, etc., is coated in a conventional manner, followed optionally by heating treatment. Although the heat-transferable ink layer shown in FIG. 1 has one layer structure, it is also possible to use a structure in which a peeling layer, an adhesive layer, etc., are formed on the supporting member side and/or the side of the medium for recording.

Figure 3:
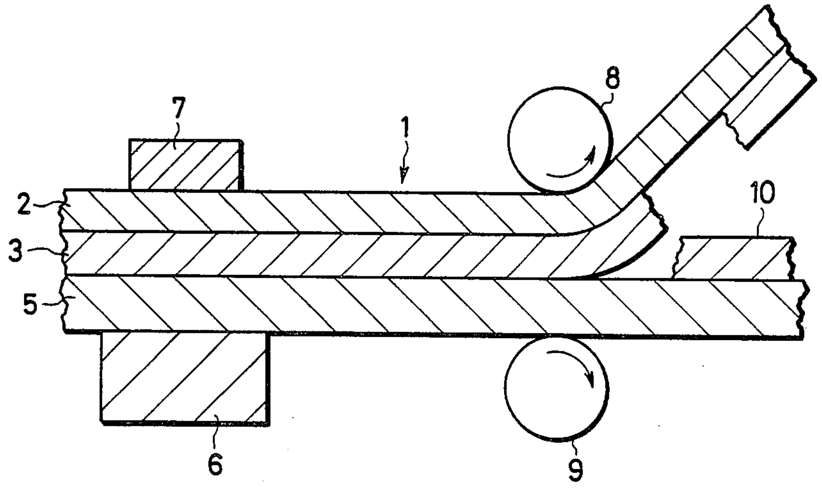
FIG. 3 is a schematic chart of the steps for illustration of the basic concept of the method of the present invention.

FIG. 3 shows the basic concept of the heat-sensitive transfer recording method by using the heat-sensitive transfer material thus obtained.

That is, the superposed composite having the surface of ink layer 3 opposed to the medium for recording 5 is heated locally at the ink layer 3 corresponding to the desired printing or transfer pattern by giving heat pulse by a thermal head 7 while supporting the composite by a platen 6. The heated portion in the ink layer 3 is elevated in temperature, whereby fusion between melted particles proceeds at least on the particle surface of the fine particles of heat-fusible resin at the heated portion in the ink layer to form a recorded image. During this process, the recorded image is improved in cohesive force due to progress of the ink layer in becoming more uniform. The recorded image obtained is cooled when the heat-sensitive transfer material 1 is separated from the medium for recording 5 at the roller portions 8, 9, whereby adhesive force of the recorded image onto the medium for recording is improved. As described above, if this separation is performed too early, the temperature within the recorded image is high and cohesive force is insufficient, to give the result that destruction occurs internally of the recorded image and no satisfactory transfer can be effected. On the other hand, if separation is conducted too late, transfer will become insufficient due to thermal fusion of the surrounding portion by thermal diffusion. The specific time length, namely the time from heating to separation, as defined above which has been found as the result of extensive studies by the present inventors may preferably be 1 to 300 msec., particularly 3 to 100 msec. When the heating source temperature is from 250° to 350° C. When the heating source temperature is from 300° to 400° C., the time from heating to separation may preferably be 10 to 600 msec., particularly preferably 20 to 120 msec.

The state of fusion of the fine particles of heat-fusible resin during heat application can be confirmed by dipping the heat-sensitive material after heating for a suitable time in a poor solvent for the ink layer such as water, alcohol, and others, withdrawing it up suitably and comparing the durability for the solvent between the heated portion and the nonheated portion. As a matter of course, the heated portion progressed in fusion between the particles is stronger in solvent resistance than the non-heated portion. The recorded image obtained is transferred onto the medium for recording 5 at the roller portion 8 to leave a transfer recorded image 10.

Having described the invention by referring to an example by use of a thermal head as the heating source for transfer recording, it will be readily understood that the present invention can be similarly practiced also when using other heating sources such as laser beam, etc.

The present invention is described in more detail by referring to the following Examples.

EXAMPLES 1-4 AND COMPARATIVE EXAMPLE

| | | |
|---|---|---|
| 20% | Aqueous carbon black dispersion | 15 parts |
| 25% | Aqueous polyethyleneoxide dispersion (softening temperature 130° C., particle size about 2 μm, molecular weight 3000) | 50 parts |
| 45% | Ethylene-vinyl acetate copolymer emulsion | 10 parts |

-continued

| | | |
|---|---|---|
| | (vinyl acetate 90%, particle size about 0.2 μm, molecular weight 100000) | |
| 20% | Paraffin wax emulsion (softening temperature 80° C., particule size about 1 μm) | 25 parts |

(All parts are parts of solid components)

The coating liquid comprising the mixture of the above components was applied by means of an applicator on a 3.5 μm polyethyleneterephthalate film (hereinafter called PET) and dried at 70° C. for 5 minutes to obtain a heat-sensitive transfer material I having an ink layer with a thickness of 5 μm.

In the ink layer of this heat-sensitive transfer material, presence of polyethyleneoxide particles was confirmed by microscopic observation.

The heat-sensitive transfer material I obtained was cut into ribbons with a width of 6.35 mm and printing was performed by means of Typestar 5 which is an electronic typewriter produced by Canon K.K.. The Typestar 5 used in this example was modified in shape so that the time required for separation may be shortened in practicing the recording method of the present invention, but the thermal head itself was not essentially changed in function at all. Also, the cassette housing the heat-sensitive transfer material was equipped with a member for controlling the time T from heating until separation by changing the position at which the heat-sensitive transfer material is held. The results are shown in Table 1. Printed state was evaluated all by visual observation.

Also, of the respective components shown below the polyethyleneoxide, the ethylene-vinyl acetate and the paraffin wax were dissolved in 900 parts of toluene at 50° C. and the carbon black shown below was dispersed by an attritor in the toluene solution as prepared above to obtain a coating liquid.

| | |
|---|---|
| Polyethyleneoxide (softening temperature 130° C., molecular weight 3000) | 50 parts |
| Ethylene-vinyl acetate resin (vinyl acetate 90%, molecular weight 100000) | 10 parts |
| Paraffin wax (softening temperature 80° C.) | 25 parts |
| Carbon black | 15 parts |

The coating liquid was applied by coating on 3.5 μm PET in the same manner as Examples, followed by drying to obtain a heat-sensitive transfer material II with a thickness of 5 μm in which the binder having the ink layer is shaped in a matrix. When the ink layer of this heat-sensitive transfer material II is observed by a microscope, it was confirmed that the ink layer had no particulate characteristic. Printing was effected on the heat-sensitive transfer material II in the same manner as Examples. The results are shown in Table 1.

During application of heat, fusion of fine particles of the thermoplastic resin at the heated portion in the ink layer was confirmed as follows.

The ink surface of the heat-sensitive transfer material was laminated on a releasing paper surface, and solid printing was performed thereon by means of the Typestar 5 as shown previously. However, no recorded image was formed on the releasing paper. When the transfer material once heated by a thermal head was soaked in water and then taken out for observation, it was found that, although the non-printed portion of the heat-sensitive transfer material I in Example was dissolved out, the printed portion maintained its form. When the same test was performed for the heat-sensitive transfer material II, no difference could be seen between the printed portion and the non-printed portion in the heat-sensitive transfer material II.

TABLE 1

| | Heat-sensitive transfer material | Time from heat application until separation (msec) | Printed state |
|---|---|---|---|
| Example 1 | I | 10 | Good |
| Example 2 | I | 50 | Very good |
| Example 3 | I | 100 | Very good |
| Example 4 | I | 500 | Good |
| Comparative Example | II | 50 | Bad printing sharpness |

EXAMPLE 5

| | | |
|---|---|---|
| 20% | Aqueous carbon black dispersion | 15 parts |
| 40% | Ethylene-vinyl acetate copolymer emulsion (softening temperature 92° C., particle size about 5 μm, molecular weight 100000) | 60 parts |
| 20% | Paraffin wax emulsion (softening temperature 80° C., particle size about 1 μm) | 25 parts |

(All parts are parts of solid components)

The coating liquid comprising the mixture of the above components was applied by an applicator on a 3.5 μm PET and dried at 70° C. for 5 minutes to obtain a heat-sensitive transfer material III having an ink layer with a thickness of 5 μm. In the ink layer, presence of ethylene-vinyl acetate copolymer particles was confirmed by microscopic observation.

The heat-sensitive transfer material III obtained was cut into ribbons with a width of 6.35 mm and printing was effected by use of the ribbon in the same manner as Examples 1–4. The results are shown in Table 2. Printed state was evaluated by visual observation.

TABLE 2

| | Heat-sensitive transfer material | Time from heat application until separation (msec) | Printed state |
|---|---|---|---|
| Example 5 | III | 50 | Good |

When the ink surface of the heat-sensitive transfer material III was laminated on a releasing paper surface and solid printing was effected thereon by the Typestar 5 as shown previously, no recorded image was formed on the releasing paper. When the printed transfer material was soaked in water and taken out for observation, it was found that, although the non-printed portion of the heat-sensitive transfer material III in this example was dissolved out, the printed portion maintained its form.

We claim:

1. A heat-sensitive transfer recording method comprising superposing a heat-sensitive transfer material having a heat-transferable ink layer on a supporting member onto a medium for recording and heating said heat-transferable ink layer according to a pattern to thereby form a transfer recorded image on said medium for recording, wherein said heat-transferable ink layer comprises a layer containing fine particles of a heat-fusible resin and said heat-sensitive transfer material after heating is separated from said medium for recording within the time from when the strength of the film formed by fusion of the fine particles of the heat-fusible resin at said pattern heated portion begins to surpass that before heating until initiation of fusion of fine particles of the heat-fusible resin around the pattern heated portion by thermal diffusion to around the pattern heated portion.

2. A method according to claim 1, wherein the time from said heating to said separation is within the range of from 1 to 300 msec. when the heating source temperature is from 250° to 350° C.

3. A method according to claim 2, wherein said time is within the range of from 3 to 100 msec.

4. A method according to claim 1, wherein the time from said heating to said separation is within the range of from 10 to 600 msec. when the heating source temperature is from 300 to 400° C.

5. A method according to claim 4, wherein said time is within the range of from 20 to 120 msec.

6. A method according to claim 1, wherein said fine particles of the heat-fusible resin have a softening temperature within the range of from 50° to 160° C.

7. A method according to claim 6, wherein said softening temperature is within the range of from 60° to 150° C.

8. A method according to claim 1, wherein said fine particles of the heat-fusible resin having particle sizes within the range from 0.01 to 20 μm comprise 80 wt. % or more of said fine particles as the whole.

9. A method according to claim 8, wherein said particle sizes are from 0.1 to 10 μm.

10. A method according to claim 1, wherein said heat-transferable ink layer contains a heat-fusible binder.

11. A method according to claim 10, wherein said heat-fusible binder has a softening temperature within the range of from 40° to 150° C.

12. A method according to claim 11, wherein said softening temperature is within the range of from 60° to 140° C.

13. A method according to claim 1, wherein the amount of said heat-fusible binder is within the range of from 0 to 400 parts by weight per 100 parts by weight of said fine particles of the heat-fusible resin.

14. A method according to claim 13, wherein the amount of said heat-fusible binder is within the range of from 0 to 200 parts by weight.

15. A method according to claim 1, wherein the thickness of said heat-transferable ink layer is within the range of from 1 to 20 μm.

16. A method according to claim 15, wherein said thickness is within the range of from 2 to 15 μm.

* * * * *